US006584409B2

(12) United States Patent
Wisecup (10) Patent No.: US 6,584,409 B2
(45) Date of Patent: *Jun. 24, 2003

(54) SEISMIC PROCESSING METHOD TO IMPROVE SPATIAL RESOLUTION

(75) Inventor: R. Daniel Wisecup, Katy, TX (US)

(73) Assignee: Westerngeco L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/804,892

(22) Filed: Mar. 13, 2001

(65) Prior Publication Data

US 2002/0161525 A1 Oct. 31, 2002

(51) Int. Cl.$^7$ .............................. G01V 1/28; G06G 7/48
(52) U.S. Cl. .............................................. 702/14; 703/5
(58) Field of Search ........................... 702/14, 17, 18; 367/73; 703/5

(56) References Cited

U.S. PATENT DOCUMENTS

| | | | | |
|---|---|---|---|---|
| 4,742,497 A | | 5/1988 | Beasley et al. | 367/52 |
| 4,878,204 A | | 10/1989 | Black et al. | 367/53 |
| 4,964,103 A | | 10/1990 | Johnson | 367/53 |
| 5,596,546 A | * | 1/1997 | Wisecup | 367/47 |
| 5,693,885 A | | 12/1997 | Neidell | 73/597 |
| 6,049,759 A | * | 4/2000 | Etgen | 702/14 |
| 6,131,070 A | * | 10/2000 | Ferber | 702/14 |

FOREIGN PATENT DOCUMENTS

GB 2348498 A 4/2000

OTHER PUBLICATIONS

R.D. Wisecup; Discussion on "Unambiguous signal recovery above the Nyquist using random–sample–interval imaging,", Geophysics, Mar.–Apr. 1999, pp. 632–636.

R.D. Wisecup; "Unambiguous signal recovery above the Nyquist using random–sample–interval imaging", Geophysics, vol. 63, No. 2, Mar.–Apr. 1998, pp. 763–771.

Norman S. Neidell; *Perceptions in seismic imaging Part 4: Resolution consideration sin imaging propagation media as distinct from wavefields*, The Leading Edge, Oct. 1997.

S.M. Deregowski et al.; *Geometrical Optics and Wave Theory of Constant Offset Sections in Layered Media*, Geophysical Prospecting, 1981, 29, 374–406.

C. L. Collins; *Imaging in 3–D DMO, Part I: Geometrical optics models*, Geophysics vol. 62, No. 1 (Jan.–Feb. 1997); P211–224, 21 Figs.

3DSymSam, Discussions on some more or less controversial issues in exploration geophysics, pp. 1–15, www,3dstnsam.nl/discussions/discussions.html, Aug. 25, 2000.

* cited by examiner

Primary Examiner—Edward Lefkowitz
Assistant Examiner—Toan M Le
(74) Attorney, Agent, or Firm—David S. Figatner; Madan, Mossman & Sriram, P.C.

(57) ABSTRACT

Temporal and/or spatial frequencies of spatially and digitally sampled 2-D or 3-D seismic data above the Nyquist frequency are preserved in full time migration of partial time migration (DMO) of 2-D and 3-D are preserved. Use is made of the fact that migration operators applied to input seismic data produce an output that need not correspond to prespecified temporal or spatial sampling values, and for sufficiently long migration operators, gives substantially uniform sampling at higher rates than the spatial and temporal Nyquist frequencies. Exact values of the partial migrated outputs are accumulated in an output buffer prior to combining them to give a migrated output with high temporal and/or spatial frequencies preserved.

11 Claims, 9 Drawing Sheets

SEISMIC PROCESSING METHOD TO IMPROVE SPATIAL RESOLUTION

BACKGROUND OF THE INVENTION

1. Field of the Invention

This invention relates to the field of seismic data processing. More particularly, this invention relates to a method of obtaining improved spatial and/or temporal resolution of 2-D or 3-D seismic data.

2. Background of the Art

A seismic survey represents an attempt to map the subsurface of the earth by sending acoustic or elastic energy down into the ground and recording the "echoes" that return from the rock layers below. The source of the downgoing acoustic or elastic energy might come, for example, from explosions or seismic vibrators on land, and air guns in marine environments. During a seismic survey, the energy source is moved across the surface of the earth above a geologic structure of interest. Each time the source is actuated, it generates a seismic signal that travels downward through the earth, is reflected and/or diffracted, and, upon its return, is recorded at a great many locations on the surface. Multiple source-actuation/recording combinations are then combined to create a near continuous profile of the subsurface that can extend for many kilometers. In a two-dimensional (2-D) seismic survey, the source and recording locations are generally laid out along a single straight line, whereas in a three-dimensional (3-D) survey the source and recording locations are generally distributed across the surface in a grid pattern. In simplest terms, a 2- D seismic line can be thought of as giving a cross sectional picture (vertical slice) of the earth layers with reflector locations roughly midway between the source positions and the receiver positions. A 3-D survey produces a data "cube" or volume that is, at least conceptually, a 3-D picture of the subsurface that lies beneath the survey area with reflector positions combining roughly midway between the source positions and the receiver positions in the acquisition grid.

A seismic survey is composed of a very large number of individual seismic recordings or traces. In a typical 2-D survey, there will usually be several tens of thousands of traces, whereas in a 3-D survey the number of individual traces may run into the multiple millions of traces. General background information pertaining to 3-D data acquisition and processing may be found in Chapter 6, pages 384–427, of Seismic Data Processing by Ozdogan Yilmaz, Society of Exploration Geophysicists, 1987, the disclosure of which is incorporated herein by reference.

Unprocessed seismic data is only of limited use to an explorationist. Seismic data as it is acquired in the field is seldom used directly, but instead it is first returned to a processing center where various mathematical algorithms are applied to the digital seismic data to enhance its signal content and generally make it more amenable to interpretation. A key step in a typical seismic processing sequence is seismic migration.

As is well known to those skilled in the art, the dip, location and character of a reflector on an unmigrated seismic section is rarely representative of the true dip, subsurface location and character of the structural or stratigraphic feature that gave rise to that reflector. Except in the case where the subsurface consists of homogenous, horizontal layers, the recorded seismic expression of a structural or stratigraphic event must be migrated before it can be reliably used to locate subsurface features of interest. In areas of steep dip, a reflection that is apparently located directly below a particular surface point before migration may, after migration, actually be found several hundreds of meters away. Additionally, in complex structural areas where faulting, severe asymmetrical folding and sharp synclines are present, diffractions and multiple reflections may interfere with reflections from the primary reflectors to the point where, without migration, the resulting seismic section bears little or no resemblance to the actual subsurface structure.

Broadly speaking, migration improves a seismic section or volume by "focusing" the seismic data contained therein, a process that is conceptually similar to that of "focusing" the image produced by a slide projector in order to obtain the sharpest screen image. Migration improves the seismic image by correcting the lateral mispositioning of dipping seismic reflectors; collapsing diffractions caused by point scattering centers and subsurface fault terminations; resolving crossing reflectors (conflicting dips); and improving the vertical and lateral resolution of the seismic data, among many others. A general description of the many ways that migration improves seismic data may be found in, for example, Chapters 4 and 5, and Appendix C, pages 240–383, and 507–518, of Seismic Data Processing by Ozdogan Yilmaz, Society of Exploration Geophysicists, 1987, the disclosure of which is incorporated herein by reference. As a general rule, seismic data that have been properly migrated reveal an enhanced or a truer picture of the subsurface than unmigrated seismic data, the ultimate goal of seismic migration being to produce a seismic section or volume that accurately represents the configuration and character of the geology of the subsurface.

U.S. Pat. No. 6,049,759 to Etgen discloses a method of prestack migration of 3-D seismic data. As taught therein, there are two broad variants of seismic migration: migration after stack (poststack) and migration before stack (prestack). Post- stack migration is applied, as the name suggests, to seismic traces after they have been stacked—a stacked seismic trace being one that is formed by combining together two or more traces after Normal-Moveout (NMO) correction to form a single composite trace that is an approximation of a zero offset trace at that location. Prestack migration, on the other hand, is applied to seismic traces before they have been stacked. Other things being equal prestack migration is always preferred—both theoretically and in practice—because it has the potential to produce a more accurate picture of the subsurface stratigraphy and structure. However, the computational effort involved in computing a prestack migration is many times that required to do a poststack migration. For 2-D seismic lines, this additional computational effort is generally manageable and, except for the longest lines, prestack migration is often applied to seismic data that has been taken in areas where the subsurface structure is complicated. Many 3-D data sets, on the other hand, contain far too many traces to be cost-effectively migrated via conventional prestack algorithms.

An attractive algorithm to approximate full prestack migration in 3-D and even for 2-D seismic acquisition is the use of Pre-stack Partial Migration, also known as Dip Moveout Correction (DMO). DMO moderates the effect of reflection-point smear and enables events to be stacked coherently moderating the effects of dip and/or azimuth. Thereafter the data can be stacked and post-stack migrated conventionally but with a substantial degree of data compression. An additional advantage is that DMO is a relatively small correction that tends to be insensitive to errors in the estimated velocity used for NMO corrections. This is a significant improvement over NMO-stack.

There are various alternative equivalent implementations of DMO. Perhaps the most popular are Hale's method and the summation method of Deregowski and Rocca. Hale's Fourier-based method, proposed in his doctoral thesis "Dip Moveout by Fourier Transform" submitted to Stanford University Geophysics Department, May 1983, is carried out in frequency/wave vector (f,k) domain. Deregowski and Rocca's summation method described in "Geometrical Optics and Wave Theory of Constant Offset Sections in Layered Media," Geophysical Prospecting 29, 374–406 (1981), is carried out in time/space (t,x) domain. It involves summation of data along a "DMO trajectory."

The migration and DMO methods disclosed in prior art and mentioned above start with digitally sampled data from a single seismic line or 2-D grid of seismic lines and obtain an output at locations that correspond to nominal positions of locations midway between the seismic sources and detectors used in the acquisition process. All of the time domain migration and DMO methods involve summation of data moved from a recorded position to an output position. In principle this is similar to what is performed in NMO correction of the data in a line of seismic data.

U.S. Pat. No. 5,596,546 to Wisecup teaches a method of preserving temporal frequency components in NMO corrected stack data that are normally lost in conventional NMO processing. Wisecup teaches the NMO correction of digital samples of offset seismic data to zero offset, where the NMO-corrected data may not fall at sampling time, and combining all such NMO-corrected contributions prior to resampling. This is in contrast to conventional NMO methods wherein an interpolation is done on the offset trace prior to NMO correction to ensure that the NMO-corrected samples fall on a discrete sampling time. The so-called Random Sample Interval Imaging ($RSI^2$) method of Wisecup preserves more high frequency data than conventional NMO-stack methods. Analogous to and in addition to the loss of temporal frequencies in conventional processing, there is also a loss of spatial frequencies in conventional migration and DMO operations. The present invention is a method of preserving these higher temporal and spatial frequencies in partial or full migration of seismic data using the concepts taught by Wisecup.

SUMMARY OF THE INVENTION

In one aspect, the present invention is a method for preserving temporal frequencies in full or partial migration of a line of seismic data using, for example, DMO. This differs from the method of Wisecup in that instead of an NMO operation, data are migrated to discrete sampling locations defined by the source and/or receiver positions. These locations are commonly midway between sources and receivers. The migration may be a partial migration such as a DMO, or it may be any full time-or depth-domain migration such as a Kirchoff migration.

In another aspect of the invention, the present invention is a method of preserving temporal and spatial frequencies in full or partial migration of a line of seismic data. This is similar to the preservation of temporal frequencies mentioned above, but additionally, the output spatial locations may be in a location not limited to being midway between a source and receiver location. In yet another aspect of the invention, only higher spatial frequencies are preserved.

Finally, in yet another aspect of the invention, temporal and/or spatial frequencies are preserved during a full or partial 3-D migration of seismic data acquired using a 2-D surface grid or a plurality of 2-D seismic lines wherein the output grid for the migration may be different from the input grid.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENTS

Figure 1A:
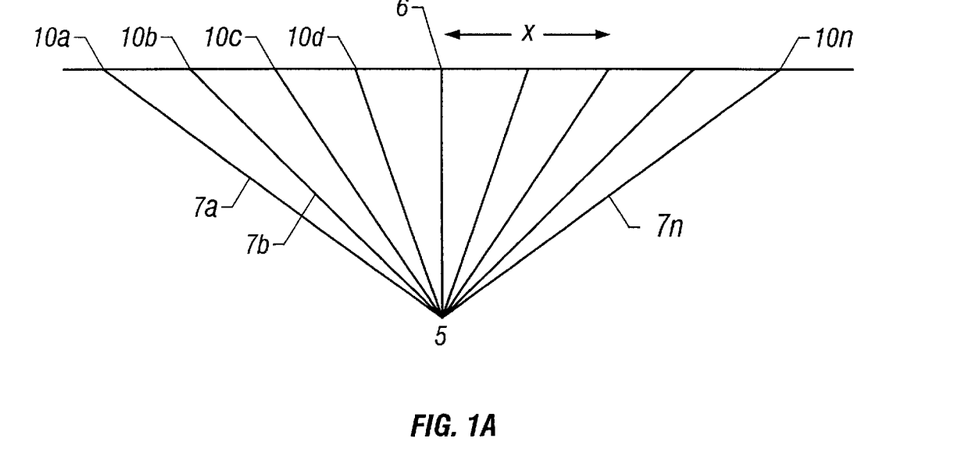
FIGS. 1a, 1b show raypaths, travel times and signals corresponding to a point diffractor at a plurality of coincident source-receiver locations.
Figure 1B:
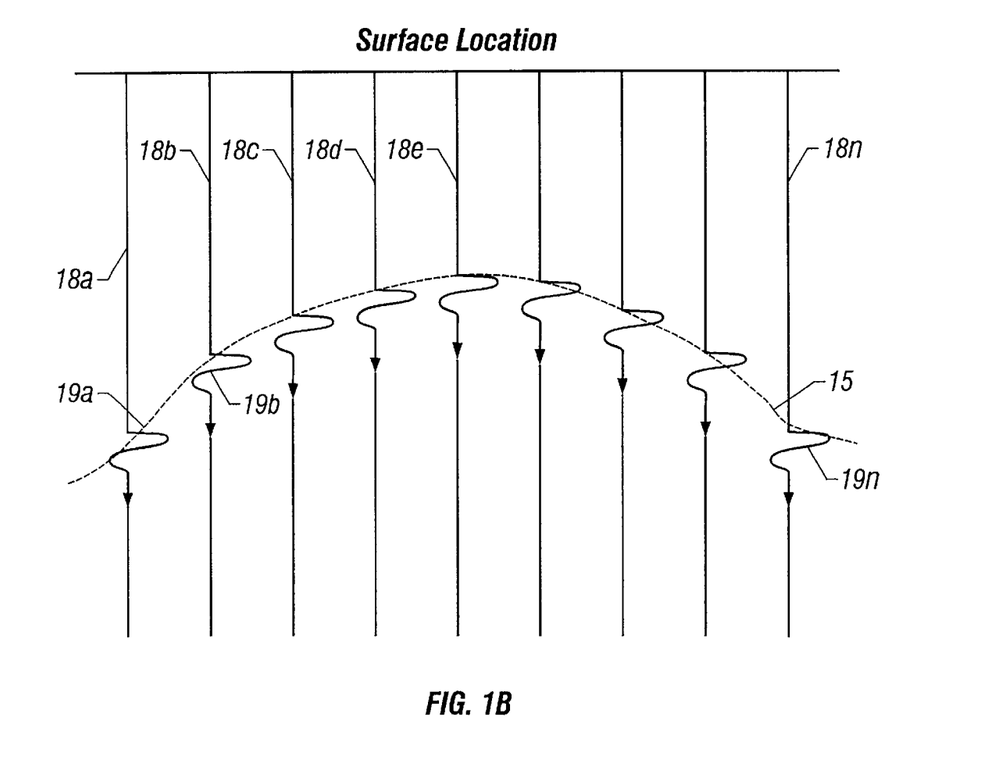

The first embodiment of the present invention is a modification of the invention disclosed in U.S. Pat. No. 5,596,546 to Wisecup and the contents of which are fully incorporated herein by reference. Referring now to FIGS. 1a and 1b, a schematic illustration of seismic data acquisition using coincident sources and receivers is shown. The surface of the earth is indicated by 1 and in the subsurface is a point diffractor 5. The surface locations of the coincident shot-receiver combinations are denoted by 10a, 10b, 10c . . . 10n and the corresponding raypaths from the surface positions are indicated by 7a, 7b, 7c . . . 7n. In FIG. 1a, the vertical axis is depth and the horizontal axis is the distance relative to the horizontal distance from the point diffractor. For this isolated diffractor in the subsurface, seismic traces that would be recorded at the surface locations are denoted by 18a, 18b, 18c . . . 18n in FIG. 1b. In FIG. 1b, the vertical axis is time and the horizontal axis is the distance from the point diffractor. The diffraction from the point diffractor are indicated by 19a, 19b, 19c . . . 19n and generally have a time-dependence denoted by the diffraction curve 15.

Denoting by x the horizontal distance between the diffractor and the recording position, the time-distance relation of the diffraction curve for a homogenous medium having a velocity v may generally be given by a relation of the form $$t_x^2 = t_o^2 + \frac{x^2}{v^2} \tag{1}$$

Figure 2:
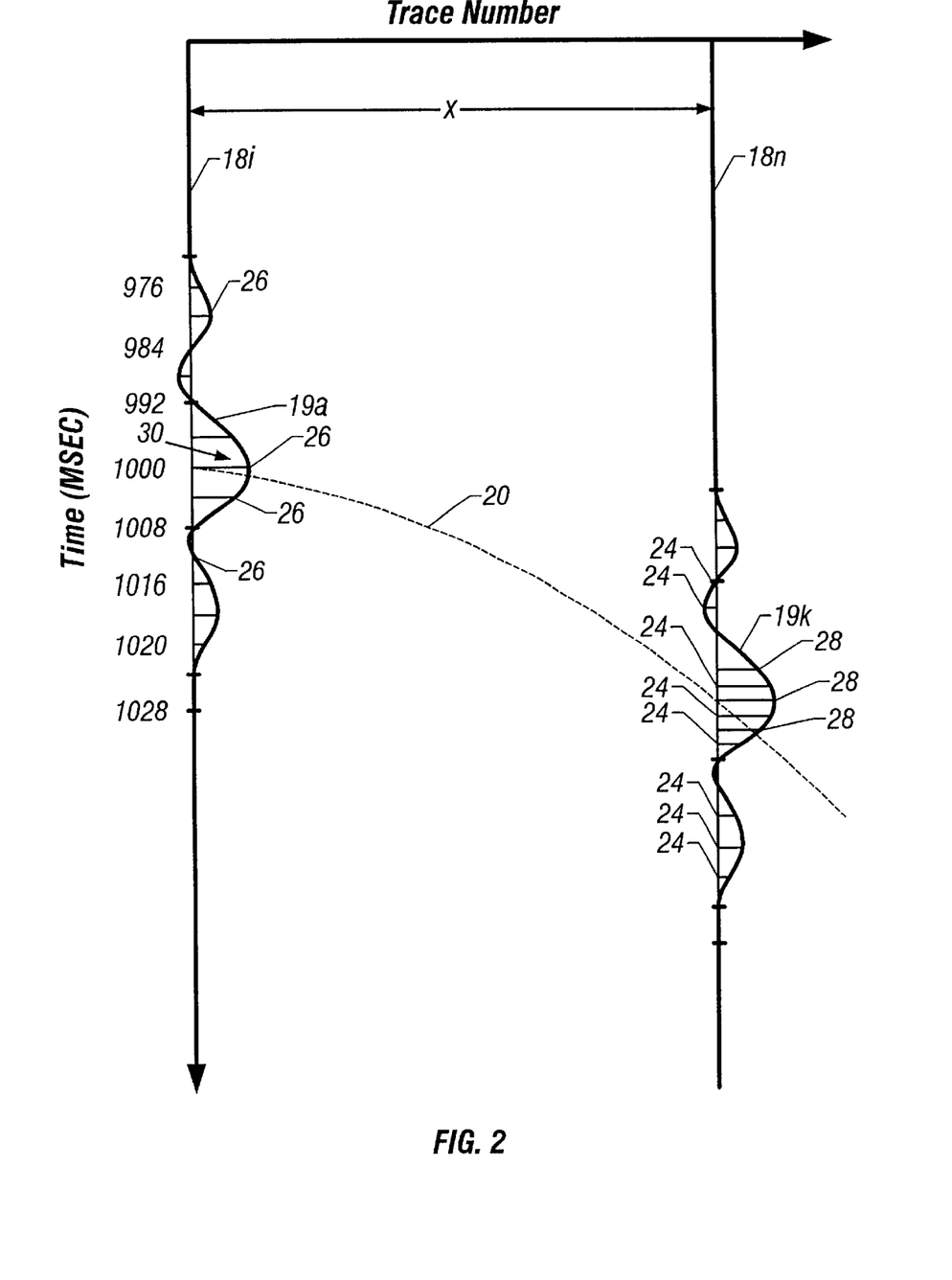
FIG. 2 illustrates the migration of an input trace to an output location preserving high frequencies.

Other, more complex relations are possible for inhomogeneous media. The implementation of the first embodiment of the present invention can be better understood by referring to FIG. 2. The traces again represent a diffractor such as 5 in FIG. 1a having an acoustic two-way travel time to the zero offset sensor 6 of 1,000 milliseconds. In a typical seismic survey, acoustic signals 18a . . . 18n at each of the sensors 10a through 10n are digitized. During digitization of the signals, individual samples are taken at spaced apart time intervals of the signals generated by each sensor 10a through 10k. The samples are generally shown at 26 for the zero-offset sensor 6, and at 24 for the other sensors. In the example of FIG. 2 the samples 26, 24 typically are taken at a predetermined time interval of two or four milliseconds, and are taken at substantially coincident times, that is, all the sensors 10a through 10n are simultaneously sampled every four milliseconds.

During processing of the digitized signals from the plurality of sensors 10a through 10n, an image of the diffractor 5 can be generated by combining the digitized signals from each of the sensors 10a through 10n to form a combined output signal. As would be known to those versed in the art, every reflector in the subsurface may be considered to be made up of a multitude of diffractors, and by proper summing along diffraction curves such as 20, a coherent image of a reflector may be obtained as a composite of the image of the multitude of diffractors. The diffraction curve 20 in FIG. 2 is the same as the curve 15 in FIG. 1a. In order for the combined signal to properly image the diffractor 5, signal combination must occur so that amplitude correspondent portions of signals from each of the sensors 10a through 10n, such as the peaks of the wavelets 19a through 19n, are combined. In generating the combined signal, however, amplitude correspondent points, which are shown generally at 28 on the non-zero offset traces may occur at times other than times at which digital samples are taken, the sample times being shown generally at 24 as previously discussed. In the present embodiment of the invention, all the digital samples 24 in each of the non-zero offset traces are time-shifted by a time value which exactly satisfies the relationship of eqn. (1) corresponding to the migration distance (x) for each of the non- zero offset sensors.

The time values for time-shifting each of the non-zero offset traces are calculated to the degree of precision to which a computer (not shown) which performs the calculations is capable. The time-shifted samples 24 are stored in a buffer, which can form part of the computer memory. The combination in the buffer of the samples 26 from the zero-offset trace 18e, and the time shifted samples 24 from the non-zero offset traces forms a combined signal with constructive interference of the diffraction signals in a manner similar to that taught in Wisecup. The contents of the buffer typically will contain a total number of samples equal to the product of the number of sensors multiplied by the number of samples from a single sensor.

The contents of the buffer also can form a stacked single-sensor signal sampled at the equivalent of a much smaller time interval than the predetermined time interval at which the samples 26, 24 were originally taken.

The diffraction curve here and the NMO curve given in Wisecup are similar. As disclosed in Wisecup, the NMO stack obtained therein preserves higher temporal frequencies than prior art methods wherein samples from non-zero offset traces are interpolated prior to being NMO corrected and summed. The increase in higher temporal frequencies in Wisecup results from the fact that the average sampling rate can be increased by as much as the multiplicity of traces within the NMO gather and from eliminating the inherent inaccuracy of interpolation.

For identical reasons, the image of the diffraction point (and any seismic image obtained by a process of time or depth migration) using this first embodiment of the invention preserves higher temporal frequency than prior art methods wherein samples for a non-zero migration distance are temporally interpolated prior to being moved along the diffraction curve and summed. As disclosed in Wisecup, even if the input data are aliased in time, frequencies above the Nyquist frequency corresponding to the input time-digitization interval are preserved in the output. In an optional embodiment of the present invention, the imaged data are low-pass filtered with a frequency of $Mxf_{Nyq}$ where $f_{Nyq}$ is the input Nyquist frequency and M is an integer less than or equal to N where N is the number of traces in the aperture of the migration operator. M is related to the output sample interval with the output sample interval being as small as 1/N of the input sample interval.

In much of seismic processing and interpretation, obtaining higher spatial resolution is more of a problem than is obtaining higher temporal resolution. Accordingly, in another embodiment of the invention, the migration is performed with only the improved spatial resolution, i.e., the diffraction operator is defined with respect to close spatial locations at discrete sampling values and the contributions from the non-zero offsets are time-interpolated prior to being time shifted. Alternatively, both improved temporal and spatial resolution may be obtained.

Figure 3:
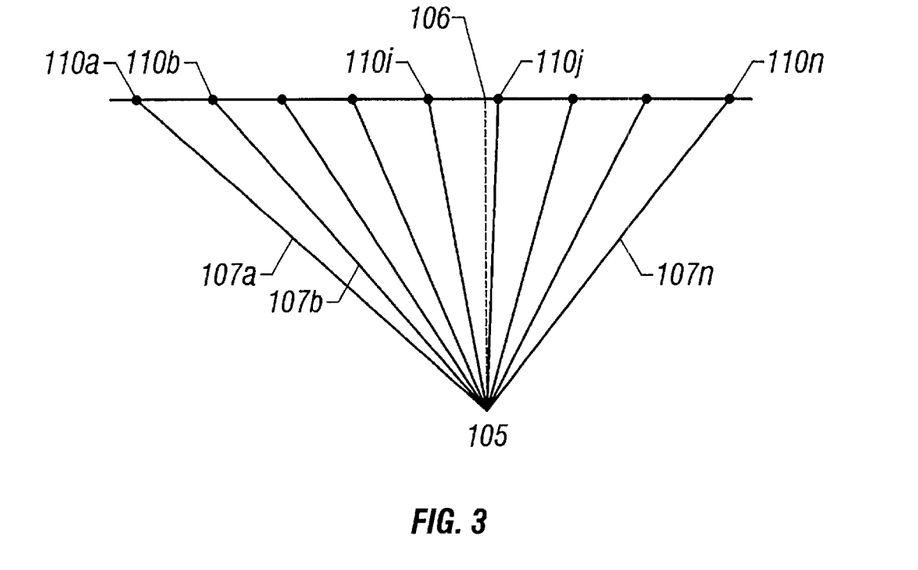
FIG. 3 illustrates raypaths from a point diffractor located at a position that does not correspond to a surface sampling location.

The improved spatial sampling is illustrated for an acquisition geometry of depicted in FIG. 3. This is similar to FIG. 1a in that there is a single diffractor 105 and plurality of coincident source-receiver locations 110a, 110b . . . 110i, 110j . . . 110n with corresponding diffraction raypaths 107a, 107b . . . 107n. A significant difference is that the surface location 106 corresponding to a zero migration distance does not have an acquisition point located thereat. This is a more realistic model. The discussion above with reference to temporal sampling applies equally to the spatial sample position represented by the point 106.

Figure 4:
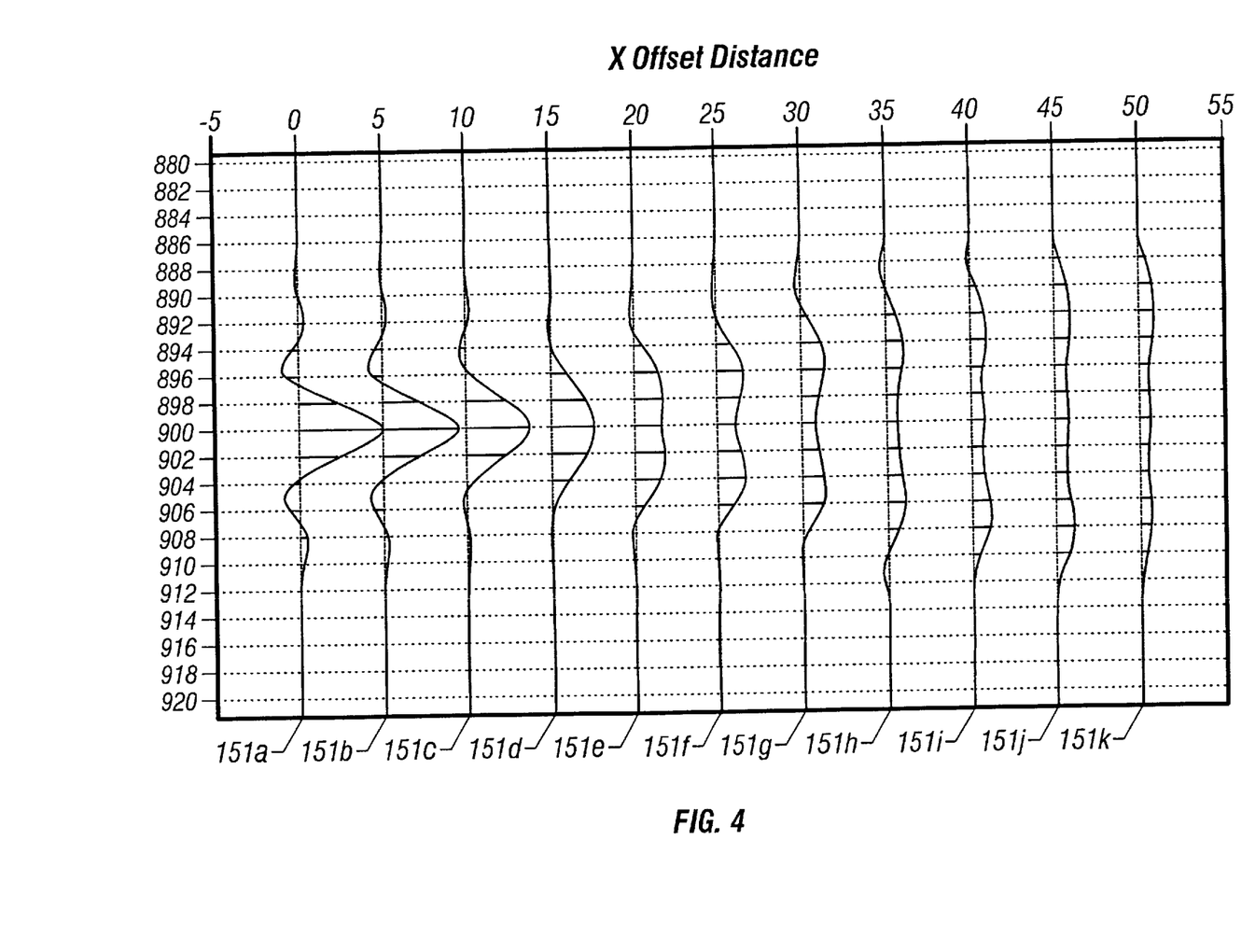
FIG. 4 shows the results of migration of synthetic data with an input sample interval of 200 ft. to an output sample interval of 5 ft.

Turning now to FIG. 4, the results of migrating a set of synthetic data are shown. The data were generated (not shown) for a model with a point diffractor and sampled with a digitization interval of 4 ms. and a spatial sampling of 200 ft. The traces 151a, 151b, 151c . . . show the results of migration of the data with the 200 ft. sampling intervals at output positions that differ only by 5 ft. Loosely applying Rayleigh's criterion (Fundamentals of Optics, Jenkins, F. A., White, H. E., 3rd edition, 1957, p300.), a wavelet is assumed to be resolved if the amplitude of the interference (partially deconstructed energy out of position) is no greater than 81.06 percent of the true wavelet amplitude. Examination of the plots of the reconstructed events shows that the amplitude appears to satisfy the Rayleigh criterion within 5 to 10 feet of the correct location, even though the input data was sampled spatially on a 200' grid. This is verified upon examination of a plot of the peak amplitude (not shown).

Figure 5:
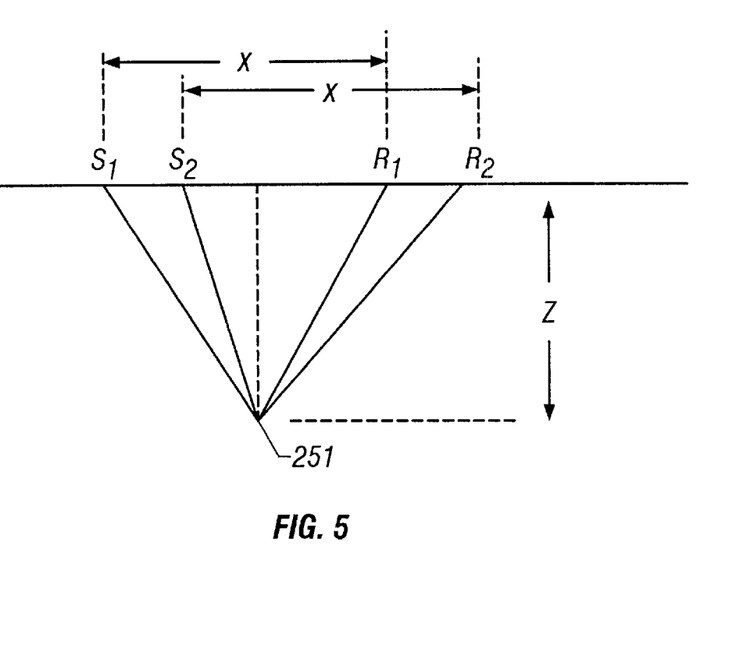
FIG. 5 shows the acquisition of a line of marine seismic data for offset source-receiver geometry and illustrate a common offset geometry

Commonly, seismic data are acquired with a plurality of source positions each of which is recorded at a plurality receiver positions. In such situations, it is common to use the Dip Moveout (DMO) operation, typically carried out on common offset seismic data as shown in FIG. 5. Shown in the figure is a diffractor 251 and raypaths from source positions $S_1$, $S_2$ to the diffractor 251 and to receiver positions $R_1$, $R_2$ corresponding to the source positions, the source-receiver distance being x. The DMO operation, as described in *Deregowski & Roca,* takes data from a common offset panel and produces a zero-offset seismic section by summing along a DMO curve that is well defined, just as the migration of a zero-offset section involves summation along a diffraction curve given by eqn. (1). The DMO operation is well known and is not discussed hereafter. In one embodiment of the present invention, data acquired along a seismic line are sorted into common offset panels, each of which is DMO corrected using the DMO operator and the RSI² method disclosed by Wisecup. The individual DMO corrected sections may then be stacked.

Alternatively, a prestack or poststack Kirchoff migration may be performed on one or more lines of seismic data; if poststack migration is used, a DMO may be applied to the prestack data. U.S. Pat. No. 4,964,103 to Johnson discloses a method in which ray tracing is performed through a 2-D or 3-D model to determine travel times from any source to any receiver. These travel times may then be used to perform a Kirchoff migration that basically combines data along diffraction curves determined from the ray-traced travel times.

Figure 6A:
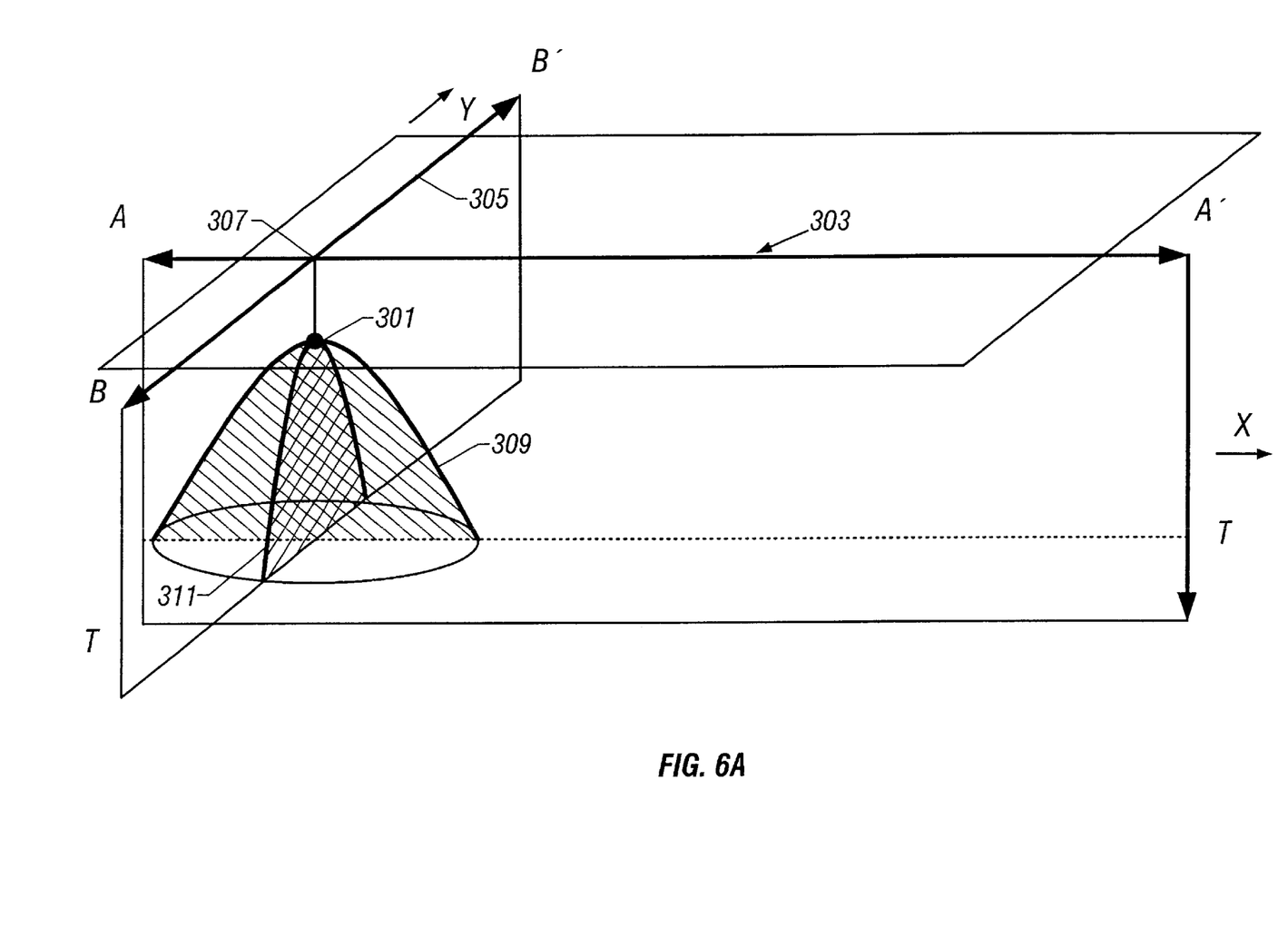
FIGS. 6A–6D show the geometry involved in various migration operations.

Next, application of the method of the present invention to 3-D migration is discussed. FIG. 6a shows a view of a portion of the subsurface with a line 303 indicated thereon. A single diffractor point 301 is shown vertically below a position 307 on line 303. For a coincident shot-receiver geometry, the curve 309 shows a diffraction curve corresponding to the diffractor 301 in the direction of the line 303. The vertical axis here is shown as time, but it could also be depth. Also shown in FIG. 6a is a diffraction curve 311 for coincident shot-receiver positions along a direction 305 perpendicular to the line 303.

Figure 6B:
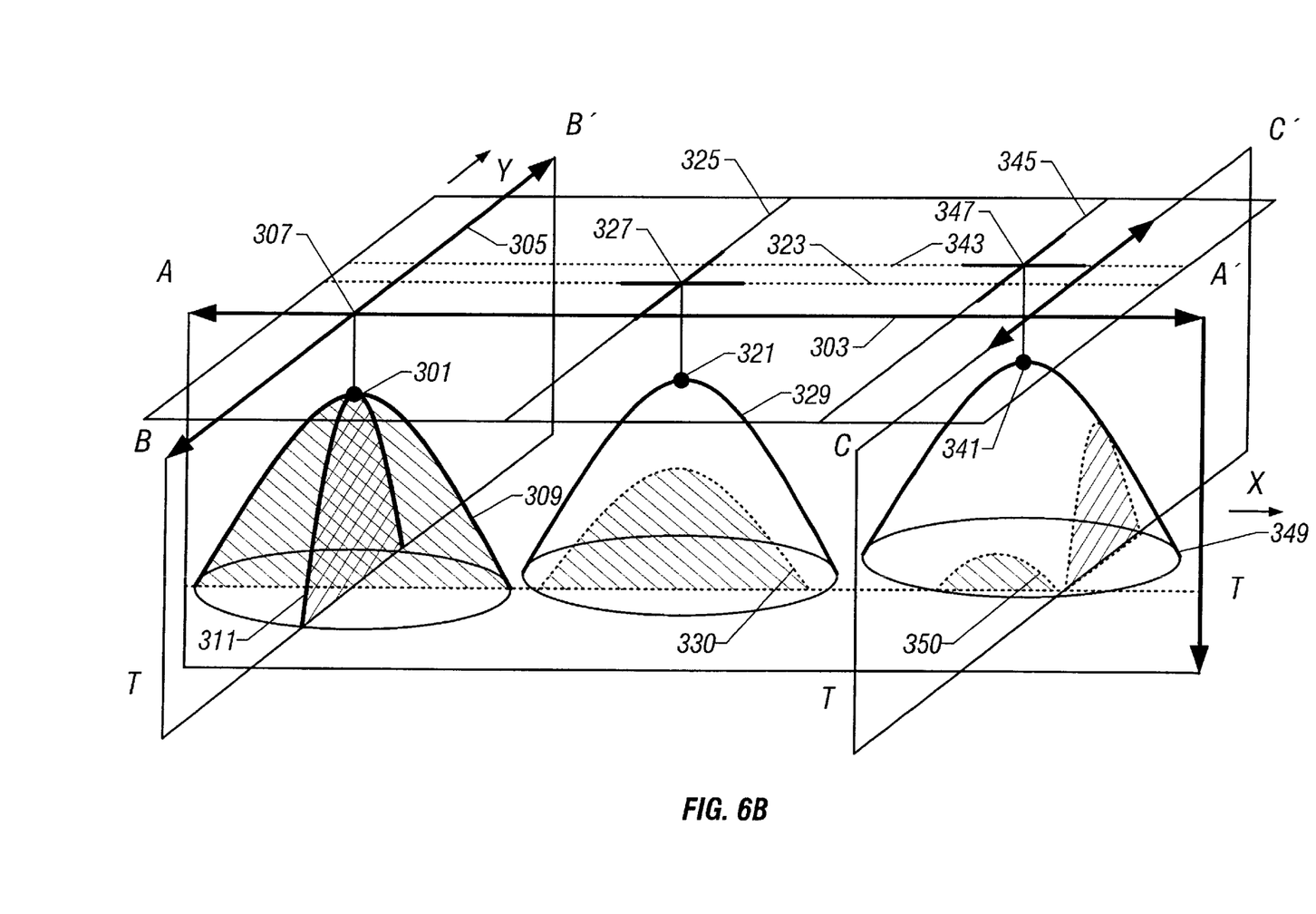

Turning now to FIG. 6b, three diffractors 301, 321 and 341 are shown, with diffractors 321 and 341 being positioned vertically beneath points 327 and 347 on lines 323, 343 respectively. As in FIG. 6a, diffraction curves 329, 349 for coincident shot receiver geometry are shown in the inline direction, i.e., along lines 323 and 343 are shown. These diffraction curves 329 and 349 are similar to the curve 309 for the diffractor 301, and, if the seismic velocities in the subsurface do not change, the curves would be identical. Also shown in FIG. 6b are diffraction curves 330 and 350 for the diffractors 321 and 341 for observation points along line 303.

Figure 6C:
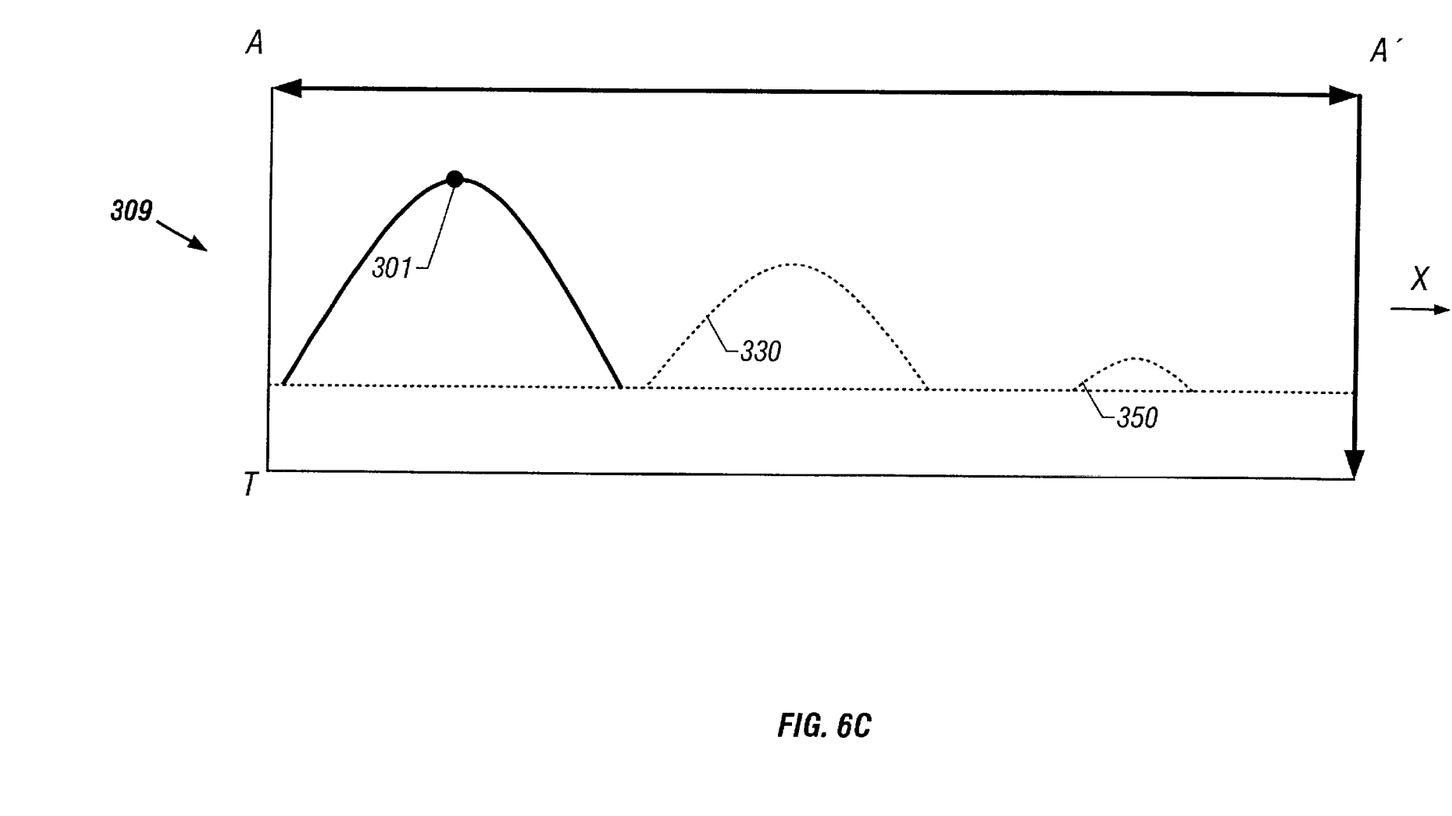
Figure 6D:
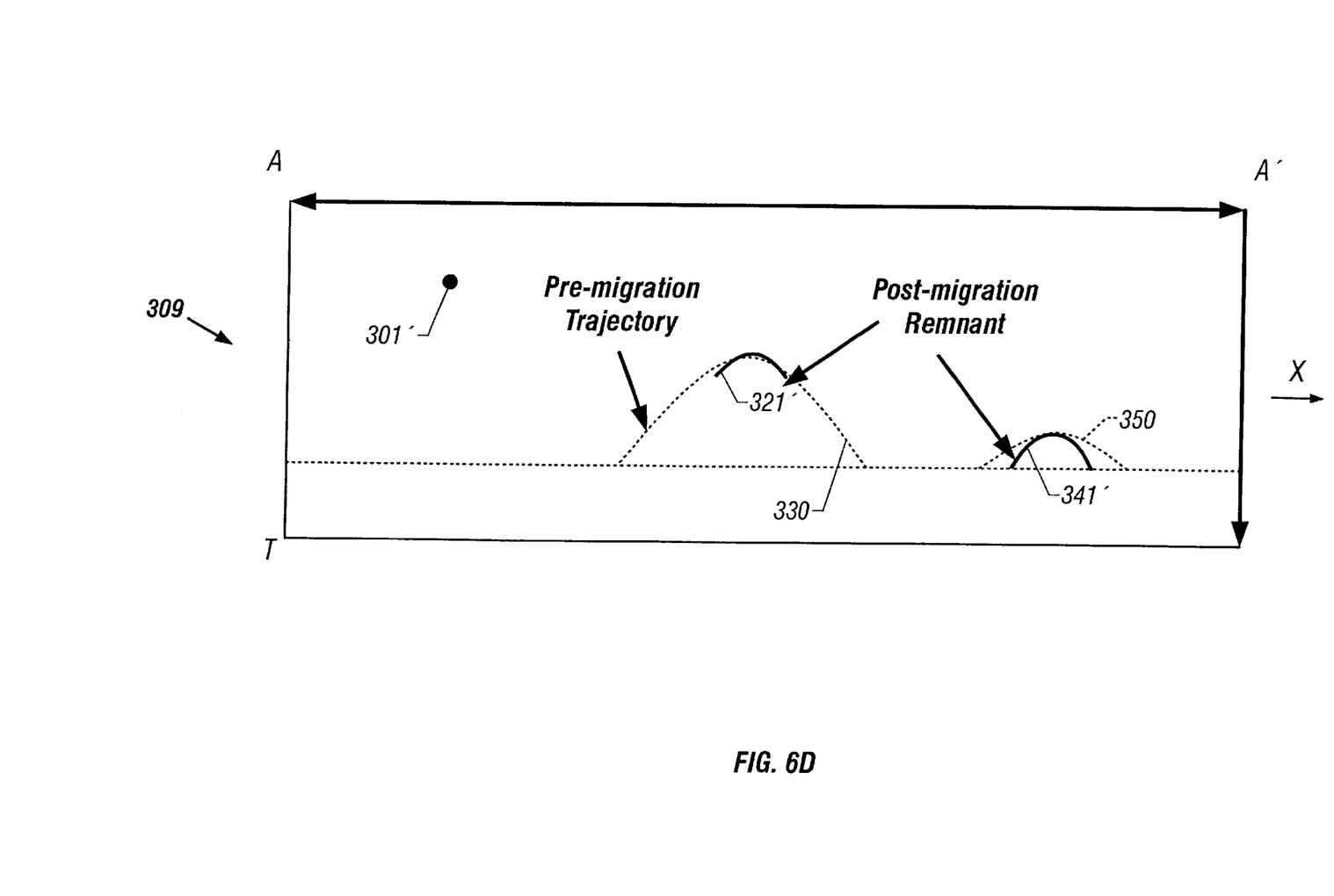

The diffractions observed along line 303 are shown again in FIG. 6c as curves 309, 330 and 350. Next, FIG. 6d shows the results of migrating the data of FIG. 6c using a correct diffraction operator for line 303. The curve 309 is correctly collapsed to the image point 301' but the diffraction curves 330 and 350 are not correctly imaged to a single point: instead, a post migration remnant denoted by the curves 321' and 341' are the result of this migration.

The purpose of a 3-D migration of data from a volume of the subsurface is to properly collapse out-of-plane diffraction curves such as 330 and 350 to a single point. This may be accomplished by a full 3-D migration, such as that taught by Johnson.

Turning next to the more realistic case of non-zero source receiver offsets, one embodiment of the present invention is suitable for migration of data acquired in a grid of 2-D seismic lines such as 305, 325 . . . 345. The same method may also be used on a 3-D data set. First a DMO is performed along lines such as 305, 325, 345. This was discussed above with reference to FIG. 5b. Following the DMO, the data are stacked along the lines 305, 325, 345 to simulate zero offset geometry and this is then followed by a migration of the DMO-stack data. Those versed in the art would recognize that the same procedure could also be used for data acquired along lines such as 303, 32, 342.

Figure 7:
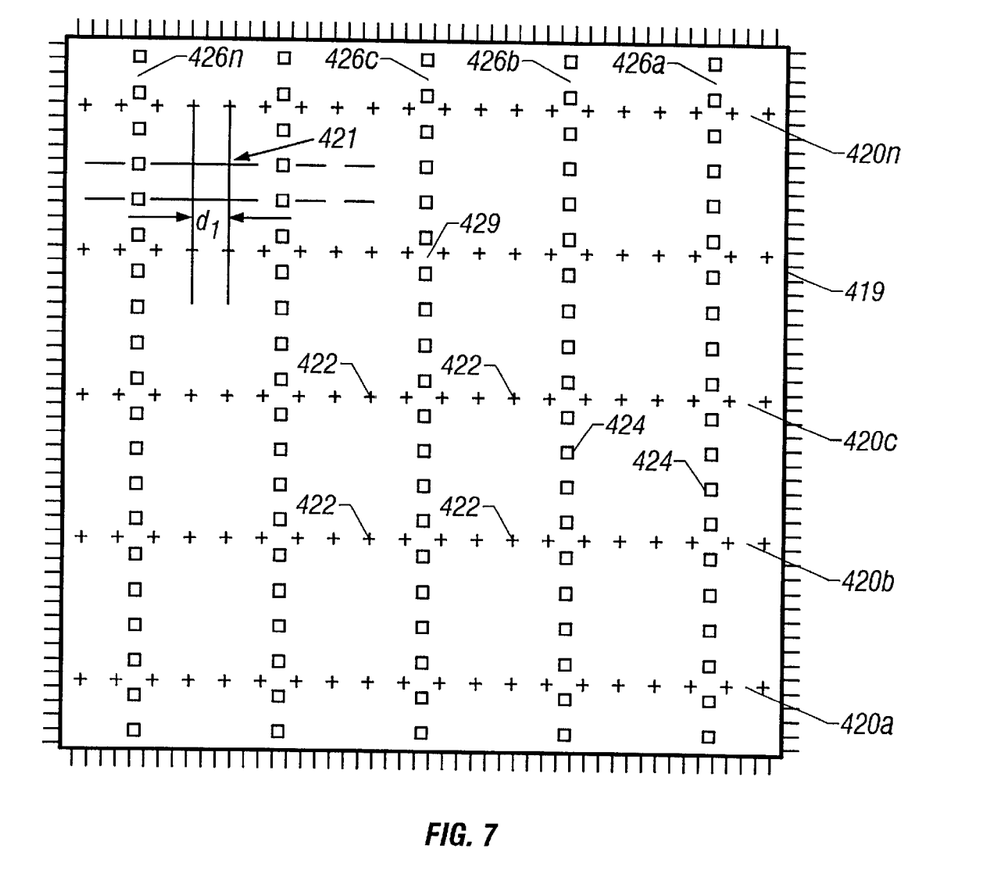
FIG. 7 illustrates a geometry commonly used in acquiring a 3-D seismic data set.

An example of a commonly used acquisition geometry for 3-D seismic data is shown in FIG. 7 wherein sources 422 may be placed along seismic lines such as 420a, 420b . . . 420n with receivers 424 deployed along lines 426a, 426b . . . 426n. For such a geometry, full 3-D migration may be used. Alternatively, a method such as that described in U.S. Pat. No. 4,878,204 to Black et al, the contents of which are fully incorporated herein by reference, may be used to perform a 3-D DMO of the data. In one embodiment of the present invention, the method of Black or other suitable method, is used to perform a 3-D DMO with enhanced temporal and/or spatial resolution using the methods described above.

In another embodiment of the present invention, a 3-D Kirchoff migration with enhanced temporal and/or spatial resolution is performed using any suitable Kirchoff migration method and incorporating the RSI² method therein.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of preserving spatial frequency components in spatially and temporally sampled signals exceeding a maximum spatial frequency related to a predetermined spatial sample interval, said signals corresponding to a plurality of sensors positioned at spaced apart locations, said method comprising:

(a) for each of said plurality of sensors, generating time adjusted samples at an output location, said adjusted samples generated to provide amplitude correspondence between each of said signals generated by each of said plurality of sensors using a migration operator related to different propagation times of energy to each of said plurality of sensors from associated energy sources; and (b) combining all of said temporally adjusted samples into a combined output signal having a spatial sampling interval smaller than said predetermined spatial sample interval.

2. The method of claim 1 wherein said migration operator is selected from a group consisting of (i) a post-stack time migration operator, (ii) a post stack depth migration operator, (iii) a pre-stack time migration operator, (iv) a pre-stack depth migration operator, and, (v) a DMO operator.

3. The method of claim 1 wherein said sensors and said associated energy sources define one of (i) a single seismic line, (ii) a grid of seismic lines, and, (iii) a 3-D seismic data set.

4. A method of preserving spatial and temporal frequency components in spatially and temporally sampled signals exceeding a maximum spatial frequency and a maximum temporal frequency related to a predetermined spatial sampling interval and a temporal sampling interval respectively, said signals corresponding to a plurality of sensors positioned at spaced apart locations, said method comprising:

(a) for each of said plurality of sensors, generating adjusted samples at an output location, said time adjusted samples generated to provide amplitude correspondence between each of said signals generated by each of said plurality of sensors using a migration operator related to different propagation times of energy to each of said plurality of sensors from associated energy sources; and (b) combining all of said time adjusted samples into a combined output signal having a spatial sampling interval smaller than said predetermined spatial sample interval and a temporal sampling interval smaller than said predetermined temporal sampling interval.

5. The method of claim 4 wherein said migration operator is selected from a group consisting of (i) a post-stack time migration operator, (ii) a post stack depth migration operator, (iii) a pre-stack time migration operator, (iv) a pre-stack depth migration operator, and, (v) a DMO operator.

6. The method of claim 4 wherein said sensors and said associated energy sources define one of (i) a single seismic line, (ii) a grid of seismic lines, and, (iii) a 3-D seismic data set.

7. A method of preserving at least one frequency component in sampled signals exceeding a maximum frequency related to at least one predetermined sample interval, said signals corresponding to a plurality of sensors positioned at spaced apart locations, said method comprising:

(a) for each of said plurality of sensors, generating adjusted samples at an output location, said adjusted samples generated to provide amplitude correspondence between each of said signals generated by each of said plurality of sensors using a migration operator related to different propagation times of energy to each of said plurality of sensors from associated energy sources; and (b) combining all of said adjusted samples into a combined output signal having a sampling interval smaller than said predetermined sample interval.

8. The method of claim 7 wherein said at least one frequency is selected from the group consisting of (i) a temporal frequency, and, (ii) a spatial frequency.

9. The method of claim 7 wherein said at least one sample interval is selected from the group consisting of (i) a spatial sample interval, and, (ii) a time sample interval.

10. The method of claim 7 wherein said migration operator is selected from a group consisting of (i) a post-stack time migration operator, (ii) a post stack depth migration operator, (iii) a pre-stack time migration operator, (iv) a pre-stack depth migration operator, and, (v) a DMO operator.

11. The method of claim 7 wherein said sensors and said associated energy sources define one of (i) a single seismic line, (ii) a grid of seismic lines, and, (iii) a 3-D seismic data set.

* * * * *